Patented Dec. 19, 1950

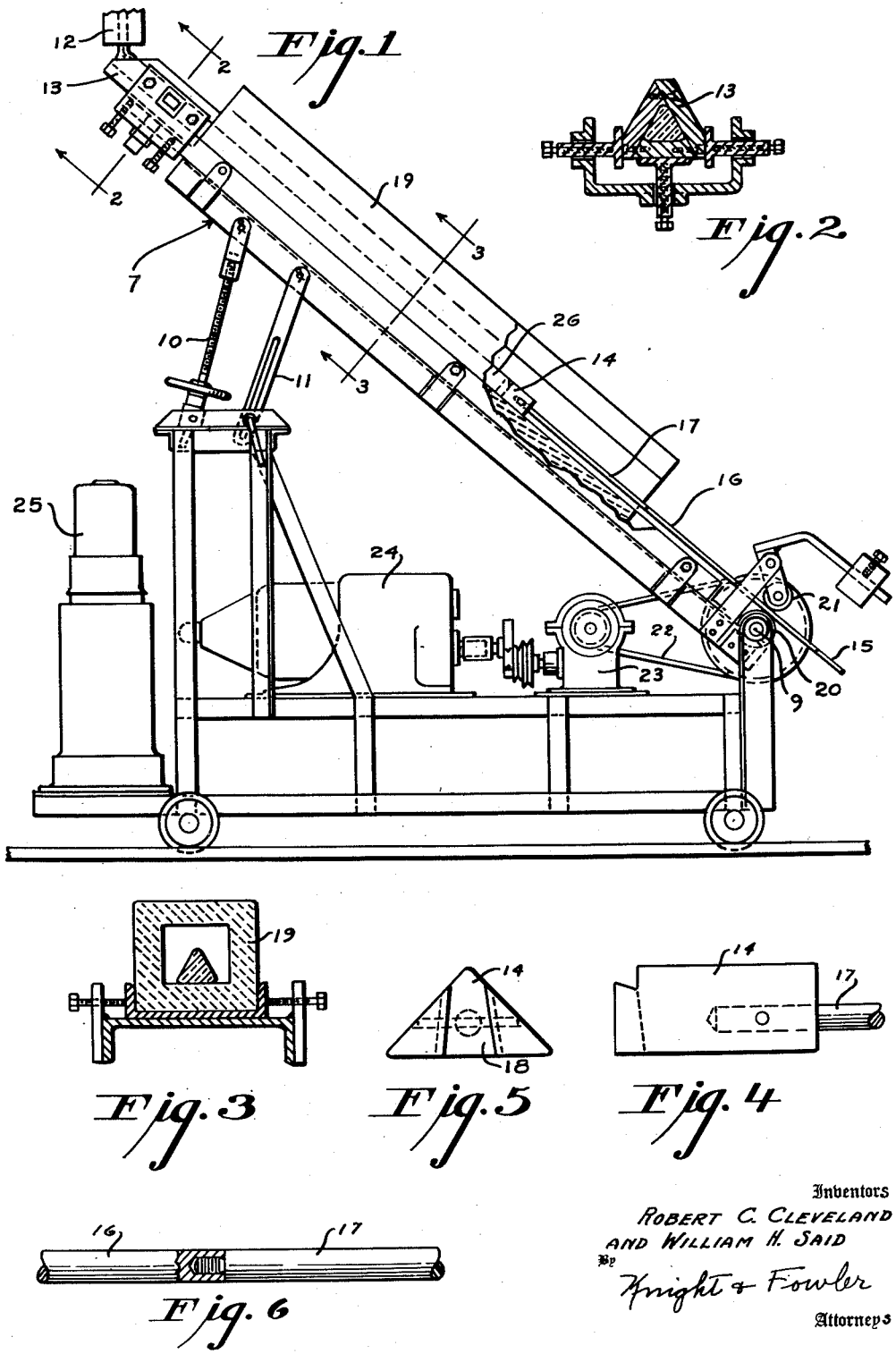

2,534,415

UNITED STATES PATENT OFFICE 2,534,415

METHOD OF CASTING GLASS

Robert C. Cleveland and William Howard Said, Corning, N. Y., assignors to Corning Glass Works, Corning, N. Y., a corporation of New York Application January 11, 1946, Serial No. 640,403

2 Claims. (Cl. 49—39)

The present invention relates to the casting of glass, and is particularly concerned with a method of mass production of optical quality cane of a desired cross-sectional configuration.

In the past it has been repeatedly proposed to make cane of a desired cross-sectional configuration and to then saw the same transversely into lens blanks of the desired thicknesses. However, the problem of producing cane of optical quality glass has been a barrier to the successful production of blanks of high grade optical glass in this fashion, as by all formerly known methods cords or striae were invariably introduced into the glass during its formation into cane and its optical quality thus destroyed, or at least greatly impaired.

The prime object of the present invention is a method of production of cane directly from a supply body of highly refined glass without the introduction of cord, striae or the like, into the product.

Another object is a method of production of glass cane of optical quality and of any desired transverse configuration.

Other objects and/or features of the invention will become self-evident from a further perusal of the specification when considered along with the accompanying drawing.

In the drawing:

Fig. 1 is a side elevational view, partly in section, showing one structural embodiment by means of which cane may be produced in accordance with the invention.

Fig. 2 is a sectional view taken on line 2—2 of Fig. 1;

Fig. 3 is a sectional view taken on line 3—3 of Fig. 1;

Fig. 4 is an enlarged side elevational view of the bait shown in Fig. 1;

Fig. 5 is an end view of Fig. 4;

Fig. 6 is an enlarged view illustrating the manner of construction of the bait support employed.

It has been observed that a freely falling stream of molten glass will fall in a perfectly straight line a limited distance, such distance depending on the working range of the glass, but beyond this distance it will begin taking a wave-like form and finally follow a spiral path. Having these observations in mind the foregoing objects have been successfully accomplished by flowing a freely falling stream of molten glass in small volume on to a movable bait or plug in a laterally confined area of a desired cross-sectional configuration, with the distance between the bait and root of the stream held to a value within which the glass flows in a straight line path, and lowering the bait and its supported body of glass cane at such a rate that the distance between the top of the formed pool and the root of the stream never deviates from a straight line path.

Referring to the drawing in detail, molten glass is supplied from a suitable supply body, not shown, to a flow spout 12. Arranged below spout 12 is a slanting support 7 pivotally mounted at 9 and provided with an angle adjusting link 10 and a locking link 11. The upper end of support 7 carries a die 13 whose bore is of a transverse configuration in accordance with that of the glass shape desired, i. e., round, oval, triangular, rectangular, square, etc., and has a slight taper whose dimension is largest at the bottom end, to reduce friction between the set glass and the die wall. Initially arranged within die 13 is a movable bait 14 of a transverse configuration usually matching that of the die bore and having a dovetail cavity 18 in its upper surface. A suitable annealing lehr 19 also on support 7 is arranged coextensive with the bore of die 13. Bait 14 is secured to one end of a support comprising a series of rods 15—17 threaded to one another and passing between drive and pressure rollers 20 and 21 arranged beyond the exit end of lehr 19. Roller 20 is adapted to be turned by a belt 22 receiving its drive from a speed reduction unit 23 driven by a motor 24. A suitable motor controller 25 enables close control of the rate of lowering movement of bait 14. The die and bait may be made of a non-wetting alloy comprising approximately 7% to 10% aluminum, less than 7% iron and the balance of copper. Alternatively, the bait and/or die may be made of carbon.

Operation

In operation the bait 14 is arranged in the upper end of die 13 a distance from the bottom of spout 12 short enough that any deviation of the stream from a straight line path is avoided, this distance depending on the fluidity and working range of the particular glass being worked. As glass issues from spout 12, the dovetail cavity 18 in bait 14 first becomes filled, after which a pool is accumulated on the top surface of the bait, and acquires depth after the confining walls of die 13 are encountered. As the top level of the accumulated pool begins to rise, motor 24 is started to drive roller 20 at such a rate that the space relationship between the bottom of spout 12 and the top of the accumulated pool of glass is maintained within the limitations permitted by the character and viscosity of the glass, the space never being allowed to reach that at which spiralling is likely to occur. The glass cane thus accumulating within the lateral confines of die 13 is slowly elongated without introducing laps or folds in the accumulated glass. As will be understood, after the operation has continued for some time the bait and set glass cane issue from the die 13. As the operation continues, bait supporting rods 15 and 16 successively pass between rollers 20 and 21. Manual lowering of the bait 14 may readily be resorted to after the bait nears the rollers 20 and 21 and until the cane 26 extends therebetween, following which the rollers 20 and 21 may again be employed to lower the cane at the appropriate rate of speed. As will be observed from an inspection of Fig. 5, the dovetail cavity 18 is of such shape as to enable removal of the bait from the cane simply by moving the bait laterally with respect to the cane.

As will be appreciated, slight variation in glass viscosity may necessitate changing the rate of lowering of the cane from time to time. This may be accomplished at will by adjustment of the motor controller 25 to suitably readjust the speed of the motor 24. The operation, of course, can be continued indefinitely, desired length sections of the work-piece being cracked off and removed from the lower end thereof from time to time in any known manner.

It should be understood that the term "cane" or "workpiece," as used herein, is to be interpreted broadly for, as previously brought out, cane of any of various cross-sectional configurations may be produced.

What is claimed is:

1. The method of forming glass cane which comprises flowing molten glass in an unconfined freely falling stream of relatively small diameter onto a relatively large diameter support initially arranged near enough to the stream source to prevent the stream spiralling while laterally restricting the spread of accumulated glass to a desired outline, progressively lowering the support at the speed necessary to maintain the top surface of the accumulated glass a distance from the root of the stream less than that at which it would spiral, issuing the glass as it becomes set into rigid cane into an unconfined area and controlling the downward movement of the accumulated glass and the adjoining rigidly set cane by direct engagement of the latter whereby the formation of cane may be continued indefinitely without interruption.

2. The method of producing glass cane, which includes intercepting near its source a continuous freely falling stream of molten glass of relatively small cross-sectional area to accumulate a pool of molten glass having a cross-sectional area larger than that of said stream, said point of interception being within the distance from the source of the stream beyond which spiraling of the stream would occur, lowering said pool of molten glass, as it accumulates, at a speed such that the distance between the point of interception of said stream and the source thereof remains less than that at which spiraling of the stream would occur, and maintaining the cross-sectional outline of the accumulated molten glass pool constant, as such pool is being lowered, until the molten glass sets to cane.

ROBERT C. CLEVELAND.
WILLIAM HOWARD SAID.

REFERENCES CITED

The following references are of record in the file of this patent:

UNITED STATES PATENTS

| Number | Name | Date |
|---|---|---|
| 779,280 | Hays | Jan. 3, 1905 |
| 1,256,980 | Chamberlin | Feb. 19, 1918 |
| 1,673,138 | Bicherou | June 12, 1928 |
| 1,729,147 | Blair | Sept. 24, 1929 |
| 1,805,260 | Reece | May 12, 1931 |
| 2,320,341 | Bowes | June 1, 1943 |